(12) United States Patent
Bley

(10) Patent No.: US 9,441,759 B1
(45) Date of Patent: Sep. 13, 2016

(54) POSITIONABLE MECHANISM FOR DUST COLLECTION PORT AND LATHE ACCESORIES

(71) Applicant: Robert Steven Bley, Menlo Park, CA (US)

(72) Inventor: Robert Steven Bley, Menlo Park, CA (US)

(*) Notice: Subject to any disclaimer, the term of this patent is extended or adjusted under 35 U.S.C. 154(b) by 33 days.

(21) Appl. No.: 14/120,707

(22) Filed: Jun. 18, 2014

Related U.S. Application Data

(60) Provisional application No. 61/846,518, filed on Jul. 15, 2013.

(51) Int. Cl.
  *F16L 3/00*  (2006.01)
  *B08B 15/00* (2006.01)
  *F16M 11/04* (2006.01)

(52) U.S. Cl.
  CPC .............. *F16L 3/003* (2013.01); *B08B 15/002* (2013.01); *F16M 11/045* (2013.01)

(58) Field of Classification Search
  CPC ..................... F16M 11/26; F16M 2200/025
  USPC ................... 248/70, 82, 155.3, 279.1, 287.1, 248/295.11, 298.1, 307, 429; 82/158, 160
  See application file for complete search history.

(56) References Cited

U.S. PATENT DOCUMENTS

| 872,905 | A | * | 12/1907 | Connors | 108/8 |
|---|---|---|---|---|---|
| 2,139,309 | A | * | 12/1938 | Linden | 248/201 |
| 2,605,136 | A | * | 7/1952 | Kline et al. | 239/282 |
| 3,007,501 | A | * | 11/1961 | Mundell et al. | 144/252.1 |
| 3,227,414 | A | * | 1/1966 | Dean | 248/443 |
| 3,464,411 | A | * | 9/1969 | Martinez | 128/202.18 |
| 4,514,936 | A | | 5/1985 | Hurtado | |
| 4,664,164 | A | | 5/1987 | Ulander | |
| 4,860,644 | A | | 8/1989 | Kohl et al. | |
| 5,211,602 | A | | 5/1993 | Holmgren | |
| 5,685,104 | A | * | 11/1997 | Breazeale, Jr. | 42/94 |
| 6,700,098 | B1 | * | 3/2004 | Wyatt et al. | 219/213 |
| 6,764,444 | B2 | * | 7/2004 | Wu et al. | 600/206 |
| 7,891,316 | B1 | * | 2/2011 | Maljaars | 119/14.1 |
| 2008/0023608 | A1 | * | 1/2008 | Hsieh | 248/307 |

OTHER PUBLICATIONS

Silicon Valley Woodturning: Oct. 2013, club newsletter, (p. 1 only) showing public use as a way to both hold a port for dust collection as well as to hold a strobe light.
Independent product review of current design by Craft Supplies USA. They are the biggest US distributer for wood turning supplies. Private correspondence. Apr. 3, 2014.

* cited by examiner

*Primary Examiner* — William Gilbert

(57) ABSTRACT

An improved device which attaches to the back of a lathe or workbench which provides variable positionability of a dust collector port or other accessories. The device utilizes a track with a sliding bracket and an adjustable arm attached to the sliding bracket. The improved device allows for better positioning of any accessory and does not inhibit any other operation at the work station.

5 Claims, 12 Drawing Sheets

POSITIONABLE MECHANISM FOR DUST COLLECTION PORT AND LATHE ACCESORIES

This application claims the benefit of provisional patent application Ser. No. 61/846,518 filed 2013, Jul. 15 by the present inventor.

BACKGROUND

Prior Art

When an artist or craftsman is working at a woodworking lathe, there are several items they require for safety and convenience. Two important ones are good lighting and good dust control for health safety. There are also occasions where the person may want to take a video for teaching classes or utilize a strobe light for freezing the image of an irregular spinning wood form. In each of these cases, correct, easy and convenient positioning of lights, dust ports, video camera, strobe light etc are essential for them to be used well if at all. If these items are not easy to reposition, they might not be used or used as effectively.

In any woodworking shop, one of the main safety/health issues is maintaining dust levels as low as possible throughout the shop by any means possible. The most efficient methods typically employed for dust collection attempt to capture as much of the dust as possible created at the source. This is typically done by connecting the woodworking machine to a dust collector through a series of duct work and hoses to a vacuum machine or dust collector.

In order to facilitate capturing dust as close to the source as possible, most woodworking equipment including but not limited to: table saws, band saws, planers, jointer's, router tables, all include dust collection ports which are incorporated right into the equipment. Some of these machines actually incorporate more than one dust collection port so that more than one dust collection hose can be connected to the machine. This is done so that dust can be collected from as many appropriate locations as is practical. Small handheld woodworking tools like electrical sanders and electrical circular saws, will include a port with an integral bag attached. Sometimes when practical, these bags can be removed and a hose can be connected to a vacuum for a more efficient process.

An attempt is made in the woodworking industry to include a cost effective and efficient method of dust control in every tool manufactured. Typically, this simply means adding a tubular port somewhere on the machine to connect to a hose or bag. The cost of this dust collection feature should add minimal cost to the equipment.

There is one piece of woodworking equipment, the woodworking lathe, that does not include any type of dust collection port or dust control mechanism at all. This is because there has been no practical way to locate a dust collection port effectively on a woodworking lathe. Woodworking lathes vary in size and can be as small as a lathe meant for turning pens, to as large as one meant to turn long bedposts or large diameter platters, bowls or urns.

A small lathe may accept a piece of wood no larger than six inches in diameter and 12 inches long. A medium sized lathe may accept a piece of wood up to 12 inches in diameter and 36 inches long. A large lathe may accept a piece of wood up to 24 inches in diameter and 48 inches long. These ranges can vary depending on the type of objects being turned. A bowl lathe may accept large pieces of wood up to 30 inches in diameter, but not very long, such as 24 inches in length.

When a piece of wood is turned on the lathe, the first stage of shaping/turning a piece is to cut the wood with sharp tools to remove the bulk of the wood and form the shape of the wooden object such as a bowl, bedpost or a baseball bat, just to name a few examples. This first shaping/turning stage generally produces large shavings and does not produce most of the unhealthy dust created in subsequent stages.

After the shaping stage is complete, a later stage of making or turning a wooden object, is to sand the surfaces smooth with sandpaper prior to applying a finish, such as oil or varnish. It is during this sanding stage where fine particles of unhealthy airborne dust are created.

This sanding needs to be done on all surfaces and at all locations along the length and diameter of the turned/formed object. In order to capture dust effectively during this sanding stage, a dust collection port needs to be positioned wherever the sanding occurs. When a wooden bowl is sanded on the inside, it is desirable to aim or position a dust collection port at the inside of the bowl. Therefore, a well designed and cost effective dust collection system would allow a dust collection port to be easily locatable anywhere along the length and various diameters of the piece; as well as the angle relative to the center line of the turning being sanded.

Since there are no well designed systems available on the market today, a large portion of wood lathe users typically will make something on their own or not use any dust collection at all. There are a few commercially available systems that are marketed for collecting dust created at the wood lathe, but these systems are inadequate, cumbersome, and limited in their ability to move and capture dust appropriately, which has led to poor adoption and use.

One such system, the Universal dust collection system, marketed by Penn State Industries, catalog # DCU, includes a floor stand and has a height extendable telescoping rod with a clamp at the top which clamps and connects a 4 inch dust collection hose to a long relatively narrow nozzle which is similar to that on a standard upright vacuum cleaner.

Several problems exist with this system. Since it is standing on the floor, all the shavings and wood chips initially created by the first stage of cutting, turning and shaping the object have fallen on the floor and make it very difficult to move this system to a new position on the floor. If moved, the presence of all the chips and shavings on the floor will not allow stable contact with the floor. The volume of the chips can easily add up to 20-40 gallons accumulating around the base of the stand, making it very difficult sweep up these shavings because the floor stand is in the way. Clean-up of the chips requires relocation of the floor stand system to another part of the shop in order to effectively clean the floor in this area. Since the floor stand and its port are attached to a hose which is attached to a central vacuum system, it is difficult to relocate the floor stand to somewhere else in the shop.

This floor stand system also requires the floor space behind the lathe to be clear of all objects including the shavings created by turning, electric cords, tool carts, etc. Also, the shape of the opening of the dust collection port is more designed for turning of spindles or relatively long/narrow turnings and is not appropriate for large bowls or platters. The system is also very heavy to move from one location to another. It is awkward and requires leaning far over the lathe. This can be stressful on the back. Also, this system does not allow for very close positioning of the port to the turning because the port is stationary at the top of a tripod. It also cannot be aimed towards the inside of a bowl being turned. The positioning is very limited and this system is cumbersome to use.

Another lathe dust collection system configuration currently available on the market is designed to work on only one specific lathe which is made by Powermatic. This design utilizes a dust collection nozzle that attaches to the lower end of a tool rest holder known as a "banjo". The problem with this configuration is that the only way to adjust the location of this port is to slide the banjo to the desired location. However, it is usually beneficial and ideal to remove the banjo when sanding. The banjo is in the way and not necessary when at the sanding stage. It also does not allow raising or lowering the position of the dust collector port. When turning a large diameter bowl or platter the port has to be pushed out of the way to allow for the diameter of the wood/turned object. Trying to push the port away makes the opposite end of the banjo closer to the turning. This defeats the purpose and becomes self-limiting in the size of turning that can be sanded with this type of dust collection system. This design is primarily useful only for small diameter/spindle turnings. It also cannot be aimed towards the inside of a bowl being turned.

Another dust collection port specific to the lathe is the "Big Gulp Ultimate Lathe Dust Hood". This system includes an articulating arm which pivots off a mechanism that slides within the working area of the lathe. Unfortunately, this is also the ideal place to be sliding the banjo/tool rest system as well as the tail stock and on some lathes, a sliding headstock. This system works only in limited situations. There are too many situations where access to where this system is mounted, makes it obstructive to many other operations. It is awkward to manipulate. This design only works to draw in dust from below the centerline of the turning. This low position might be acceptable when sanding a wood object while it is actually spinning. However, when hand sanding or sanding with an electrically powered sander at or near the top of the bowl, this low dust collection port is in a poor position for capturing the dust created by sanding.

Articulatable Fume Exhauster, U.S. Pat. No. 4,860,644 shows a complex assembly of rigid conduits which are held together by an expensive series of gears and plates. This system is marketed for more than the cost of most woodworking lathes. It does not move in a linear motion with respect to the length of a lathe even if it was financially feasible to use it. If moved from left to right along the length of the lathe, the open port changes its distance from the work and its angle to the work also changes and is not positionable. Similarly, U.S. Pat. No. 5,211,602 shows another complicated expensive system. It does not travel along the linear axis and is meant for positioning in and out relative to a position on a wall or ceiling.

U.S. Pat. No. 4,664,164 shows a dust collection port built into the tool rest of the lathe. It is intended to capture the fine dust created when turning with wood cutting tools. This design does not work for power or hand sanding after the turning with tools is completed. If so, it would require putting this tool rest in close proximity with the turning object and the sanding operation which is very dangerous as one may catch and electric cord or their hand in between this tool rest and the turning object. U.S. Pat. No. 4,514,936 A, Lathe dust enclosure shows a way to capture just at a different type of lathe. It is meant to fully enclose the rotor system of a brake lathe. It is not practical to completely enclose a woodworking lathe as it would encumber all shaping operations.

There is also a limited variety of options commercially available for positioning a lamp/light at the lathe. There are no lamps designed with similar adjustability in mind. When trying to position a light source for wood turning, there are typically only a few options commercially available. One available option is a gooseneck lamp coming from a magnetic base. Another option is a gooseneck lamp attached to a fixed point or two near or on the lathe. There are a only few lathes currently on the market which incorporate a lamp system. One is the Large Powermatic 4224 lathe which includes two gooseneck lamps attached to a metal bracket in the back of the lathe. The headstock on this lathe slides back and forth and the lamps are attached to a bracket which is attached to the headstock. Therefore, when the headstock is moved to different positions along the length of the lathe, the incorporated lights travel with it. But the lamps cannot slide independent of the headstock. This is severely limiting when trying to work far away from the headstock or when trying to point a light source into the open end of a hollow form vessel/urn. Additionally, most lathes do not include any light system at all. There is no light system designed for sliding up and down the length of the lathe which will reach over to the front where the operator is working yet stay out of the way of the operator's actions.

The lack of a postionable lamp or dust collection is also present in a few other woodworking areas such as at a general workbench. Most lamps are in a similarly fixed position or have to be detached by pulling a magnet off of a metal location. Most workbenches are made of wood and do not include metallic locations for a magnetic base to attach to. And no workbenches allow for adjustability of a dust collection system position.

There is currently no dust collection port on the market or found in the prior art which allows for adjustability both along the length of the lathe and in and out relative to the centerline of the turning, height and it's angle of presentation. Because of these limitations, very few wood turners will utilize any of the above available systems and typically try to come up with something on their own. This is why this system was created.

SUMMARY

A device supplied either as an accessory or a built-in system to allow various accessories, such as dust collection ports, lights, video cameras, etc to be positioned at different locations and angles along the length of a lathe, workbench or other shop tool. The device includes a linear guide positioned substantially parallel to the bed of the lathe, a sliding bracket, which slides along the linear guide and, an adjustable arm extending from the sliding bracket, in such a way that the adjustable arm positions a dust collection hose or other accessory in a desired position.

FIGURES

Figure 3:
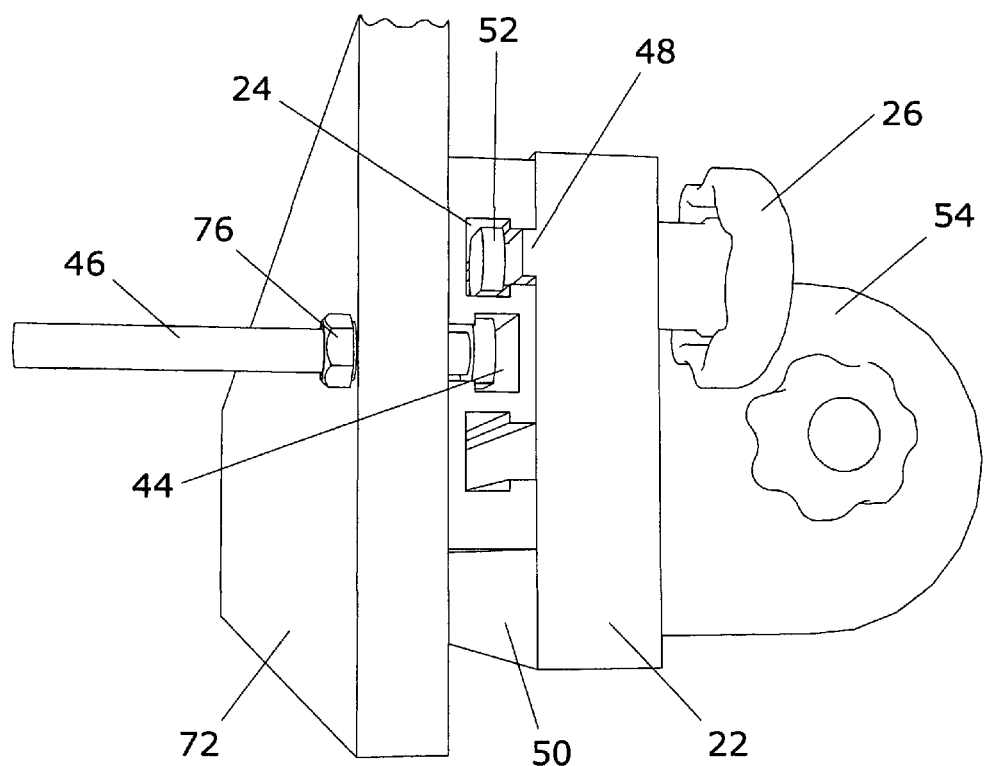
Figure 4:
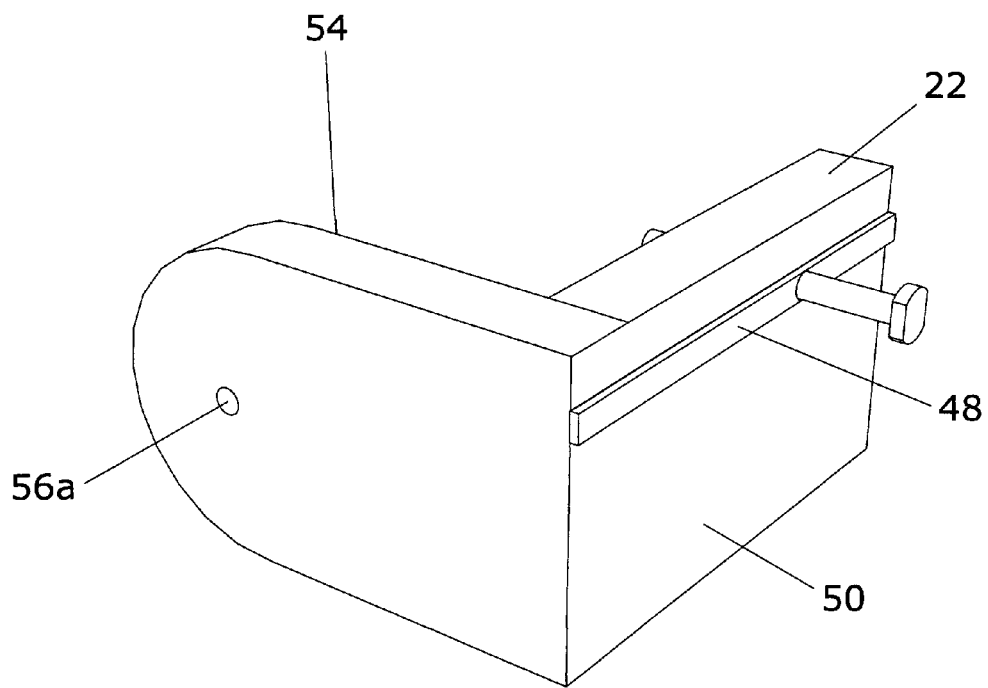
Figure 5:
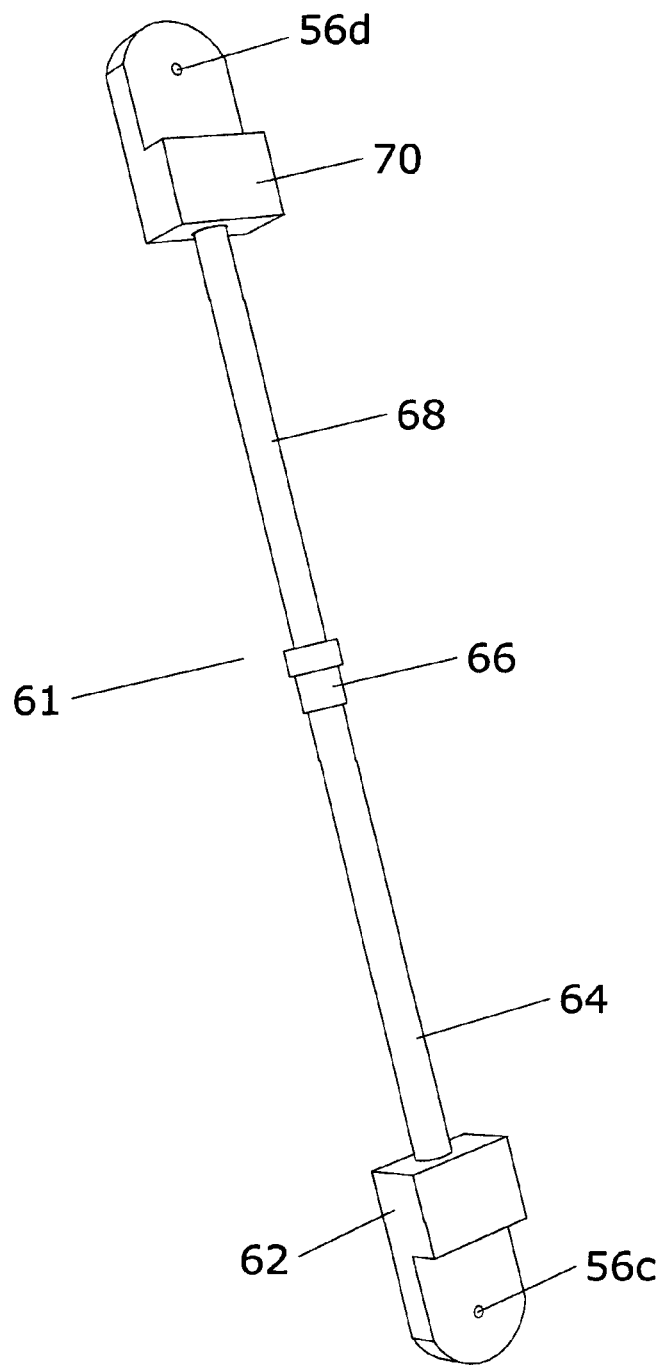
Figure 6:
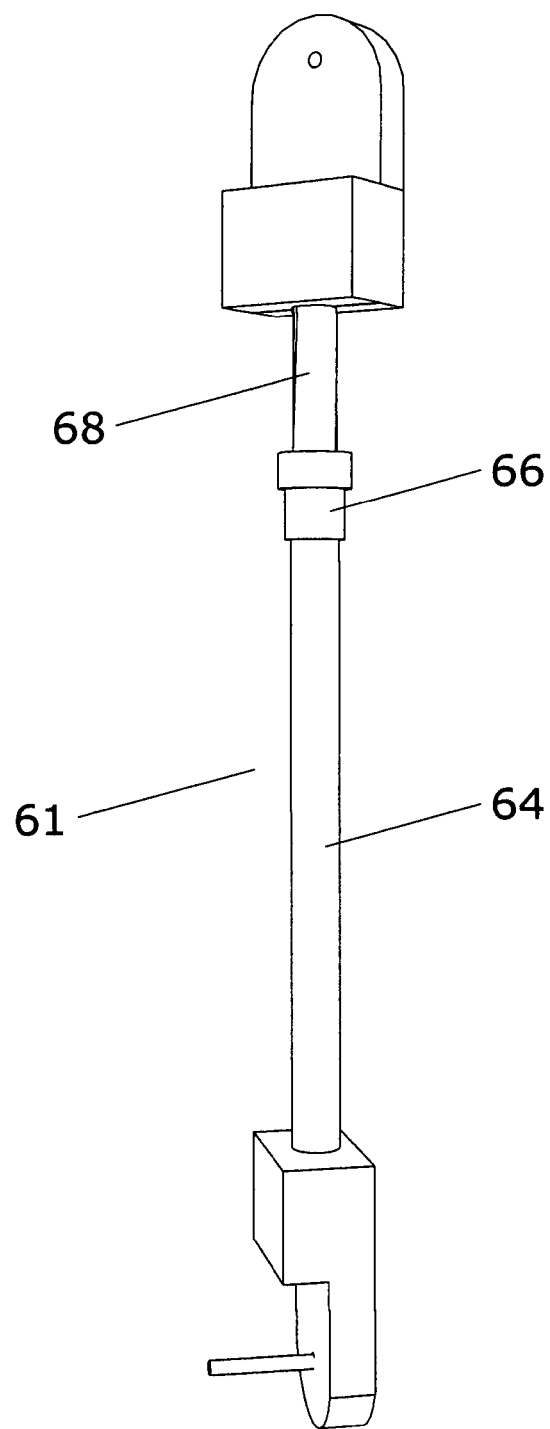
Figure 7:
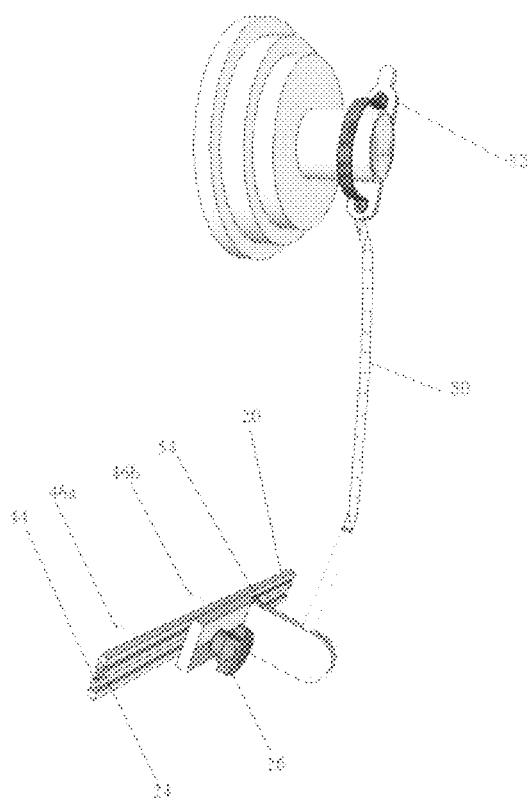
Figure 8:
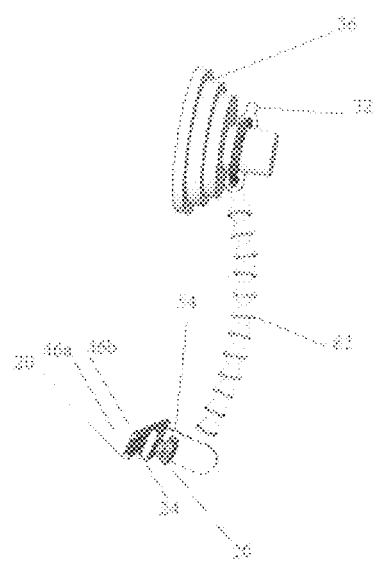
Figure 9:
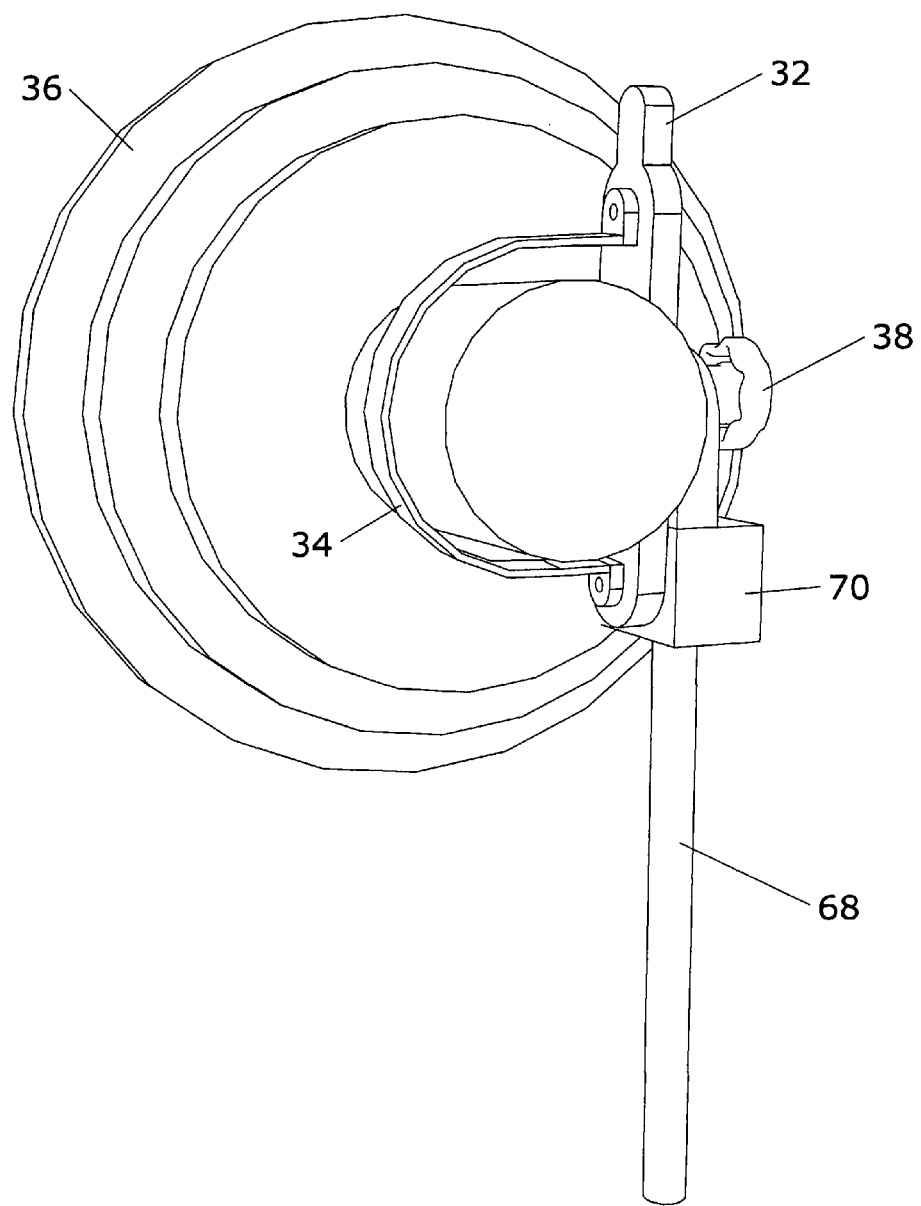
Figure 10:
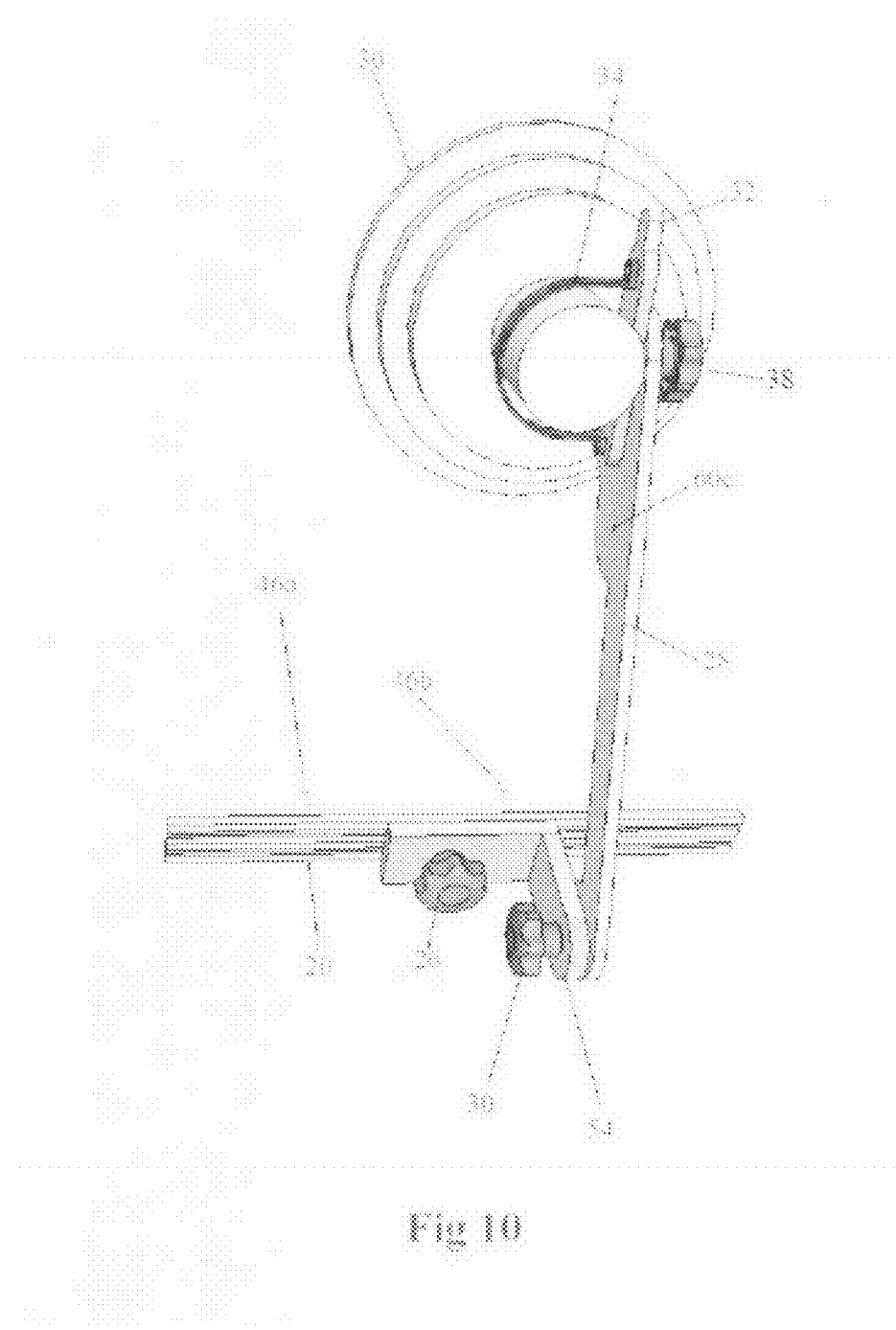
Figure 11:
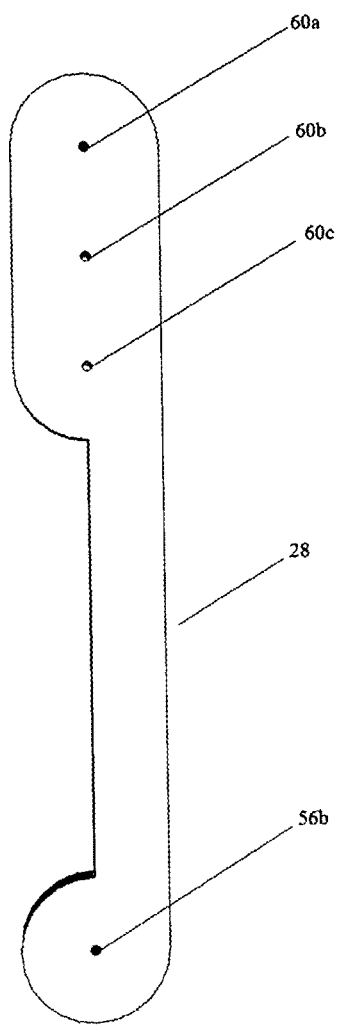
Figure 12:
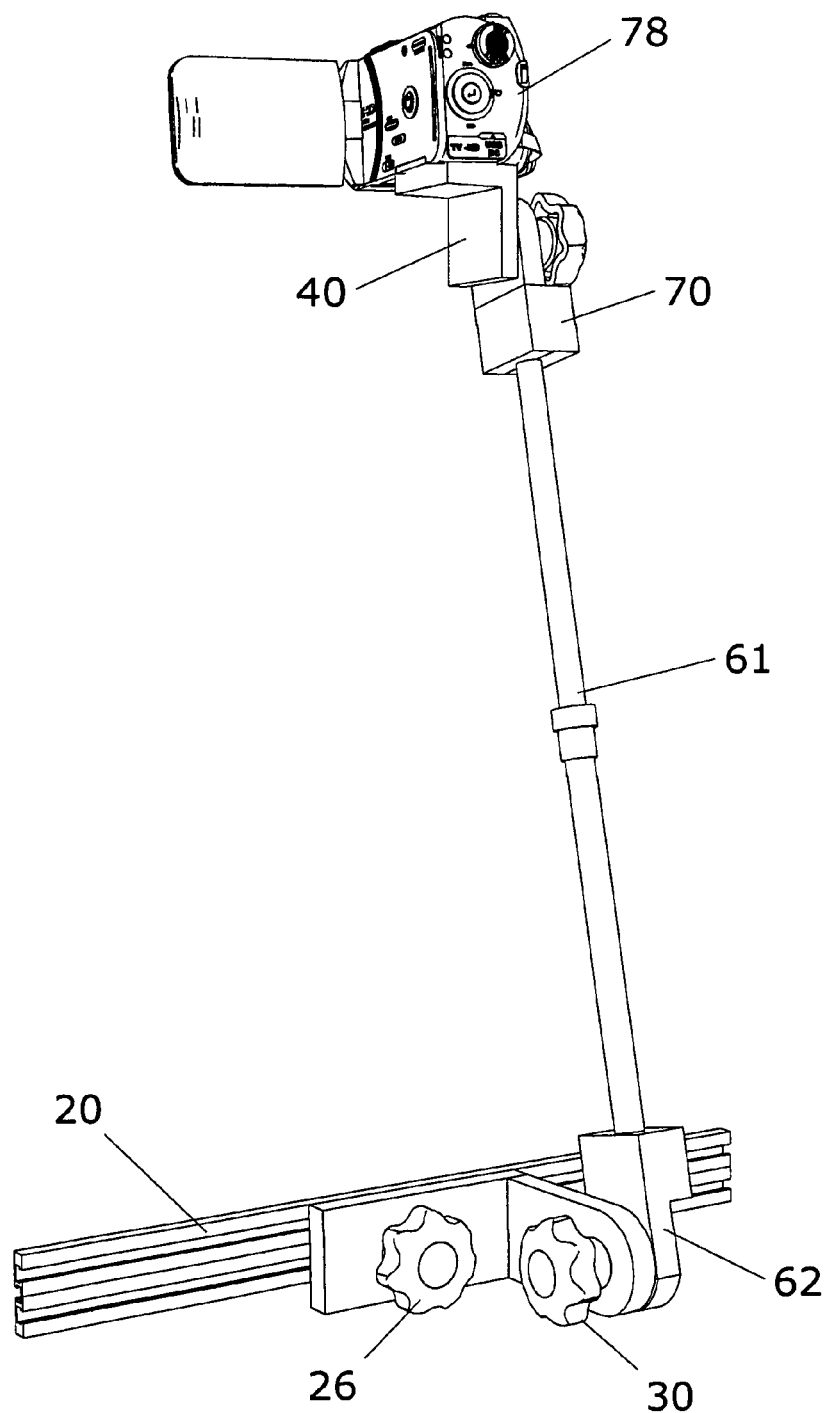

FIG. 3 is detailed view of the sliding bracket assembly, with neighboring components FIG. 4 is a view of the backside of the sliding bracket assembly FIG. 5 is a detailed view of the extended telescoping and twisting arm mechanism FIG. 6 is a detailed view of the retracted telescoping and twisting arm mechanism FIG. 7 is a view of an assembly utilizing a gooseneck mechanism FIG. 8 is a view of an assembly utilizing a ball and socket mechanism FIG. 9 is a view of the dust-port assembly, with swivel head and handle FIG. 10 is a view of an assembly utilizing a fixed swing arm mechanism FIG. 11 is a detailed view of the swing arm FIG. 12 is a view showing a camera being used with this system.

DETAILED DESCRIPTION OF THE INVENTION

First Embodiment

Figure 1:
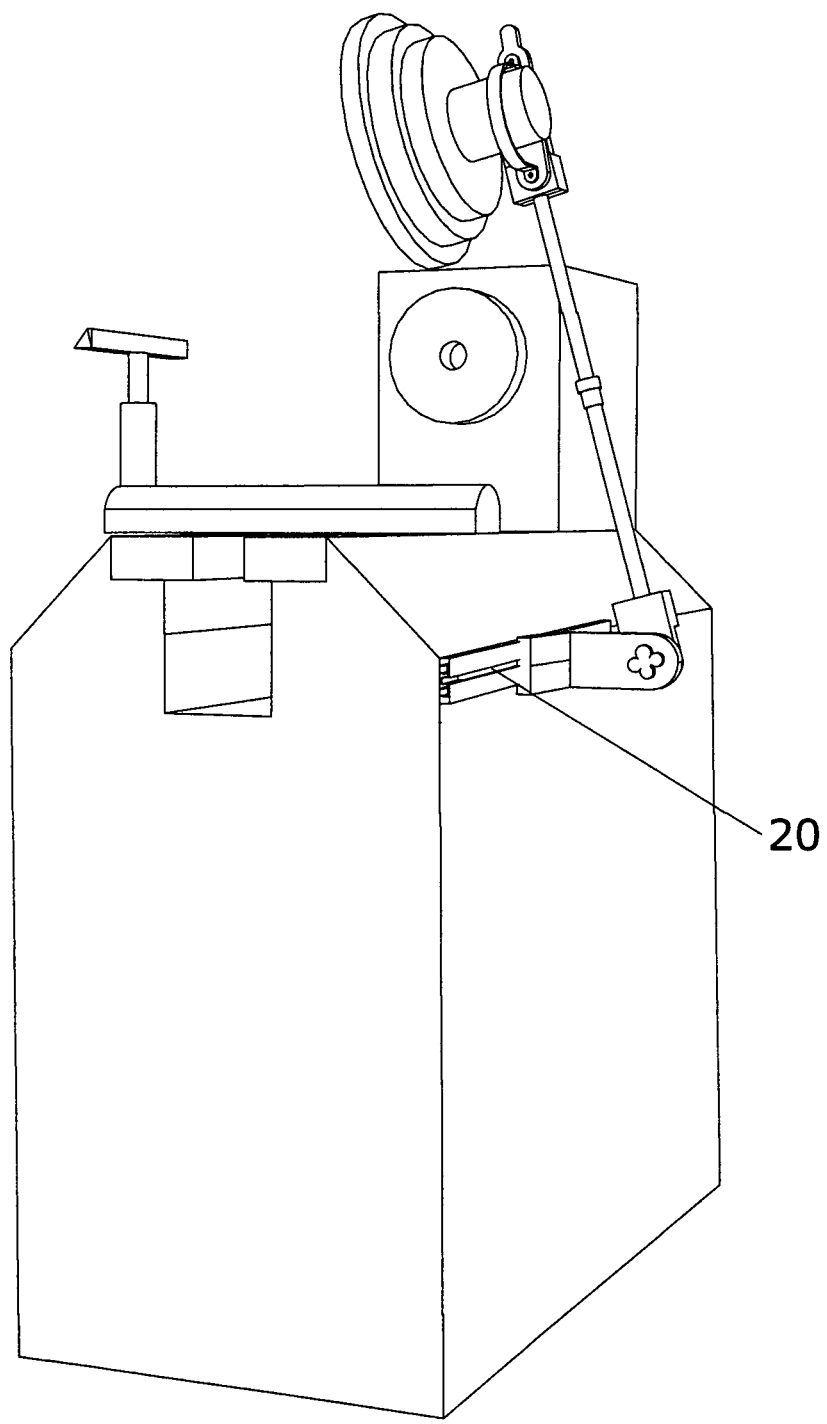
FIG. 1 is a view of the device attached to the back of a wood lathe with dust collector port being used. A dust collection hose is not shown so as to not obscure figures.
Figure 2:
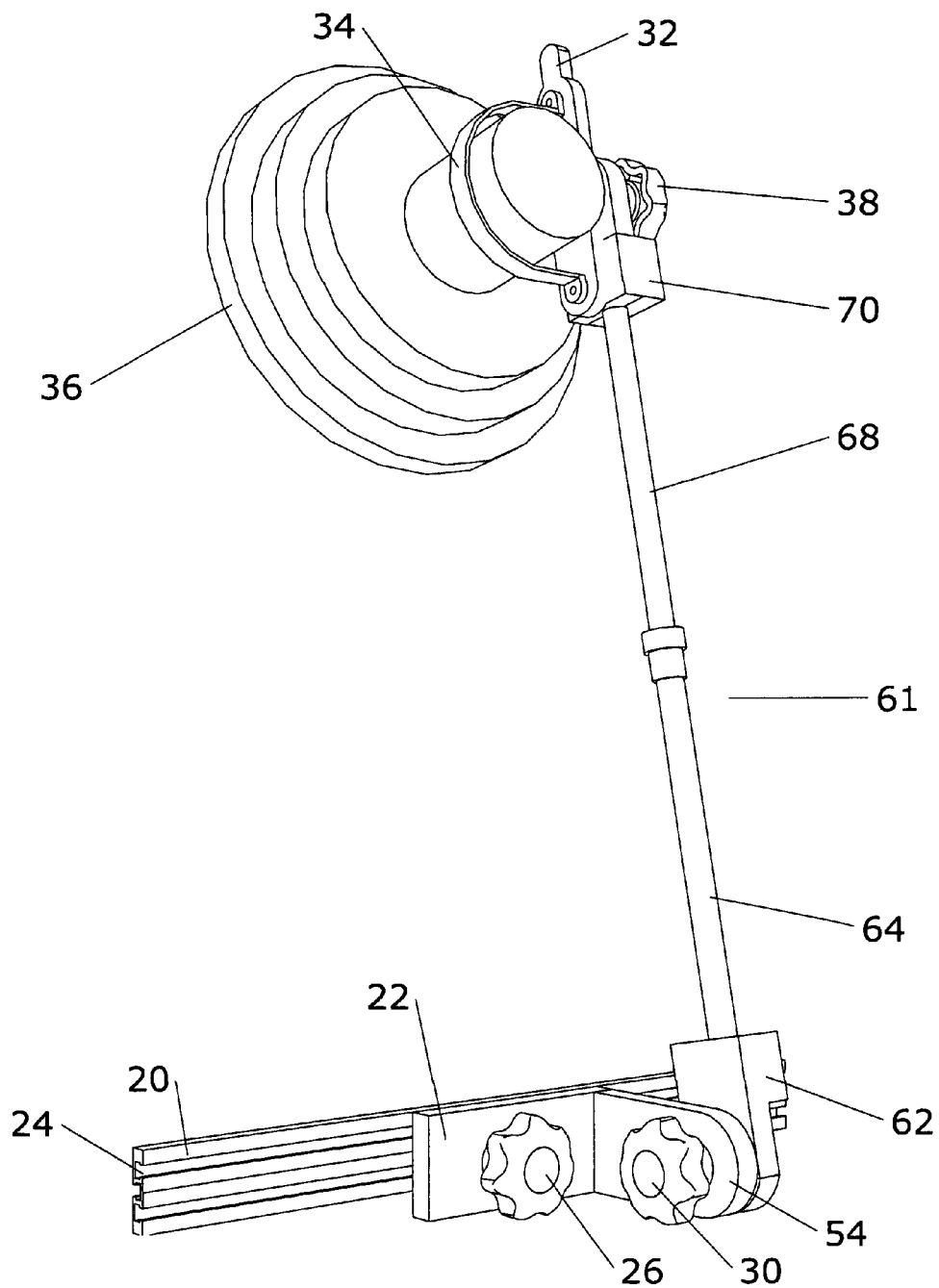
FIG. 2 is a view of the assembly of the components

The invention incorporates a linear guide means, Track 20, which is attached to or incorporated into the backside of the lathe or workbench. It is shown attached to the back of a woodworking lathe in FIG. 1. This Track 20 runs substantially parallel to the bed of the lathe. As shown in FIG. 2 and FIG. 3, Track 20 includes a T slot 24 which runs parallel to the length of the Track 20. A sliding bracket means 22 slides in either direction along the Track 20. Sliding bracket means 22 incorporates a protruding guide or guides 48 which are positioned to slide within a portion of T slot 24. This protruding guide 48 keeps the sliding bracket tracking relatively parallel to the track as the sliding bracket is positioned along the track. These guides can be in various forms such as a round pin or pins sticking out from the surface 50, FIG. 4, of the sliding bracket assembly 22. Or, these guides can be a long continuous or intermittent raised section as, shown 48 which will stop sliding bracket assembly 22 from racking as it is sliding along track 20. It these guides can have a profile to match the shape of the slot that it is traveling in, such as a general "T" shape.

Surface 50 along with guides 48 would preferentially be made out of a rigid material with a low coefficient of friction, which would allow for easier sliding along the length of Track 20. Candidate materials for this would include, but not be limited to: high-density polyethylene, ABS, glass filled ABS, nylon, Acetal, aluminum or stainless steel. Ideally the guides 48 would be made out of a molded thermoplastic, such as ABS or High density Polyethylene or Acetal with a smooth low friction surface.

A first handle 26 allows the sliding bracket assembly 22 to be locked in place at any position along Track 20. A variety of handle shapes and types, and/or quick release mechanisms, can be utilized here as well as in all the other locations described later. The ideal handle would allow for easy gripping, provide for good leverage for secure tightening, and not be so large that it gets in the way of the other mechanisms. Quick release mechanisms, such as those used on bicycle wheel hubs, may also be used. Connected to first handle 26 is a standard "T" nut threaded rod 52. "T" nut threaded rod 52 slides within a "T" slot 24 within track 20. Ideally, "T" nut threaded rod 52 slides within the same T slot 24 along with guides 48. However, it is perfectly acceptable to have "T" nut threaded rod 52 slide within a separate/additional "T" slot which can also be incorporated within track 20. "T" nut threaded rod 52 can be a variety of hex nuts or any securing system so that when the handle 26 is turned, it allows for tightening and securing sliding bracket assembly 22 in position on track 20, or when loosening handle and freeing sliding bracket assembly 22 so that it may slide freely along track 20.

The size of the "T" nut threaded rod 52 is such that it slides freely within T slot 24 but does not spin within the same slot. Any mechanism to allow for relatively quick tightening and loosening will work.

Positioned somewhere along sliding bracket assembly 22 is a stationary pivot arm 54. Ideally, stationary pivot arm 54 would be positioned on one end or the other of sliding bracket assembly 22. It should be positioned far enough away from first handle 26 so as to not inhibit tightening or loosening of the handle. Stationary pivot arm 54 can be integrated into sliding bracket assembly 22 in the manufacturing process, by molding or machining or attaching separately to sliding bracket assembly 22 by bolts or screws. Stationary pivot arm 54 incorporates a pivot hole 56a which allows for pivot block 62 or fixed swing arm 28, to pivot freely relative to stationary pivot arm 54.

One embodiment utilizes a telescoping tube assembly similar to an extendable painter's pole as shown in FIG. 1, FIG. 2, FIG. 5, FIG. 6 and FIG. 12. A typical telescoping tube assembly is described in patent EP 1039149 This telescoping tube assembly has the feature of allowing attachments to be positioned in various angles, planes and heights. By loosening second handle 30, the lower pivot block 62 and telescoping assembly 61 can be positioned to the desirable angle and then locked in place by retightening second handle 30. FIG. 5 shows pivot hole 56c on lower pivot block 62, which the threaded bolt 74 passes through, and is tightened or loosened by second handle 30.

By loosening the collet mechanism 66, the upper telescoping tube 68 can be twisted to any rotational position as well as adjusted to any height. The collet mechanism 66 is tightened to hold upper telescoping tube 68 in a position relative to lower telescoping tube 64.

The ability to adjust the length of the telescopic tube assembly 61 allows the system to be attached at any height on the back of a lathe or workbench and then be adjusted for ideal positioning at any desirable height. The telescopic tube assembly 61 can be supplied at a compressed length from 12" to 18' and then expanded to about 20" to 34". One embodiment would be to supply the telescopic tube assembly 61 at a compressed length of about 16". This would accommodate a large range of lathe sizes and attachment positions on the lathe.

FIG. 5 shows telescoping tube assembly 61 in a raised position with the upper pivot block 70 relatively parallel to lower pivot block 62. FIG. 6 shows telescoping tube assembly 61 in a lowered position with upper pivot block 70 twisted relative to lower pivot block 62. The upper pivot block 70 is fixed to upper telescoping tube 68 so that they are essentially acting as one unit. Twisting of upper pivot block 70, allows for the attached dust collector port, camera, light or other accessory to be angled in multiple directions giving the operator any desirable positioning.

Swivel head 32 holds the dust collection port 36 and associated dust collection hose (not shown) by means of dust port bracket 34, as shown in FIG. 9

Upper pivot block 70 incorporates a pivot hole 56d which allows for swivel head 32 to be rotated to multiple positions. When third handle 38 is loosened, it allows swivel head 32 to be rotated relative to upper pivot block 70. Once swivel head 32 is in the desired location, third handle 38 is tightened to hold swivel head 32 in place, as shown in FIG. 9

FIGS. 10 and 11 shows another embodiment, where swing arm 28 pivots off fixed arm 54 at pivot hole 56b, and can be held in any position by tightening second handle 30. Adjustment of swing arm 28 allows for the easy positioning of the dust collection port 36 or other accessory inwards and outwards, relative to the centerline of the lathe and correspondingly to get closer to, or farther from, an object being turned. It can be positioned out of the way when turning tools are being used and no dust is being created, and it can be moved easily into close proximity of the turned object when sanding and dust is being created.

At the end opposite of the pivot hole 56b of swing arm 28 ideally there can be, but is not required, an swiveling head 32. Attached to this swiveling head 32, or alternatively attached to the top of the swing arm 28, is a mechanism such as a hose clamp or bracket 34 or a location to attach a dust collection port 36.

Swing arm 28 is of appropriate length to reach from the pivot hole position 56a and 56b up to the approximate centerline of the lathe. Various lengths of swing arm 28 can be provided to accommodate the different sizes of lathes. Some lathes only allow for 12" diameter turnings to be made, and some lathes allow for greater than 24 inch diameter turnings. Alternatively, swing arm 28 can be made one long length with various holes 60a, 60b, 60c, positioned appropriately to accommodate the different sizes of lathes. Additionally, swing arm 28 can be made of two or more sections which slide relative to each other, to allow for different variations in length.

Incorporated within swing arm 28, and block 62 is a recess at the pivot hole 56b and 56c, which allows for a hex or "T" nut to be captured without spinning, when second handle 30 is turned clockwise or counterclockwise for tightening or loosening. In another embodiment, any variation of quick release mechanism can be utilized, such as used on bicycle wheel hubs.

Optionally, attached to the top of the swiveling head 32 or to the end of the swing arm 28, is a mechanism or bracket created as a location to attach a lamp, camera or other accessory. FIG. 12 shows the first embodiment with telescoping tubes 61 utilizing an accessory bracket 40 to attach to a video camera 78. Any variety of accessories such as a fixed lamp, gooseneck lamp, camera, strobe etc., can be attached to this location 40. These accessories can be held in place to bracket 40 by any variety of mechanisms, such as, but not limited to: magnets, screw clamps, bayonet mount or quick release couplers.

Another embodiment which utilizes an alternative to telescoping tube 61 or swing arm 28 would be a large gooseneck lamp style mechanism 80, or a mechanism similar to an articulating lamp mechanism instead of the swing arm. This has the advantage of being positionable in many directions and planes. This is shown as gooseneck arm 80 in FIG. 7.

Another embodiment which utilizes an alternative to telescoping tube system 61 or swing arm 28, or gooseneck mechanism 80, would be a ball and socket style mechanism 82 as shown in FIG. 8. A typical ball and socket configuration is described in U.S. Pat. No. 7,891,615 B2. This has the advantage of being positionable in many directions and planes.

Track 20 ideally has a T slot 44 on the side which is placed against the lathe as shown in FIG. 3. This slot 44 allows for a "T" nut or "T" bolt 46 to slide freely to any position along the length of the track, to align with corresponding mounting holes on the lathe.

Mounting the track to the lathe 72 in FIG. 3 simply requires two or more holes to be incorporated or drilled into the back of the lathe and these bolts 46 can be placed through the holes and secured from the opposite side of the body of the lathe 72 with nuts 76. Often, the lathe has structural members at various positions along the length of the lathe to provide strength to the lathe. Because most lathes have these structural members at different positions and all lathes can be of different lengths, these structural members could get in the way if the bolts were in a fixed position on the track. Allowing these bolts 46 to slide freely within T slot 44, to any position, allows for the track to be mounted away from these structural members.

The linear guide, Track 20 can be positioned substantially parallel to the lathe. It is not required that it is absolutely parallel, but preferably within 20 degrees of parallel and ideally within 5 degrees of parallel.

Advantages

Since it is positioned on the back of the lathe, Track 20 and its corresponding sliding bracket system, allows complete use of all other tools without having to remove or readjust the position of a dust collection system.

With any of the above mentioned embodiments, by sliding the bracket assembly 22 to the desired position along the track 20 and locking it in place by tightening first handle 26, the system can be located anywhere along the length on the back of a lathe. This is done without obstructing anything that would normally slide within the bed of the lathe, such as, but not limited to, a sliding headstock, a sliding banjo and it's tool rest, a tail stock, a steady rest, a coring system, a hollowing rig, or any other tool designed to slide along the lathe within the ways of the bed which is the working area of the lathe. This system allows for permanent mounting without obstruction of other operations.

Additionally, the floor can be shoveled and swept of the piles of shavings without having to move any part of this system. Since it can stay permanently in place, it saves time compared to other systems and it is more likely to be used to capture dust and provide for a better, healthier environment for sanding wood on the lathe.

Since the diameter of a turned object can vary from the size of a large diameter platter of 24" or more, down to the size of a small diameter pen of about ½", the swing arm 28, telescoping arm 61, gooseneck arm 80 or ball and socket arm 82, can be adjusted to allow the dust collection port 36 to be positioned as close as possible to the turned object. Since it can be positioned so close to the source of the sanding dust being created, it will capture more dust then any previous dust collection system for the lathe it will also provide for a better, healthier environment for sanding wood on the lathe.

Another great advantage of this invention over the current state-of-the-art is that there is no support stand on the floor. So, all the shavings and dust created by turning, can be readily shoveled with a dust pan or swept with a broom without having to work around a heavy floor mounted system with a large footprint.

Providing a simple, effective system for the wood turner to collect dust will provide a healthier environment for sanding of wood on the lathe. Sanding of wood creates a lot of potentially harmful dust which can be breathed in by the operator. Since no good system for capturing this dust at the source has existed until now, manufacturers have created respirator air filter systems built into face shields. Until now, wearing a good quality dust mask or respirator has been absolutely necessary due to the difficulty of positioning and capturing dust at the source. While no dust collection system can capture all dust, it will always be safest to wear a dust filtration mask, however with this system; it is much easier for the operator to easily position a good dust collection system in the best location to capture as much dust as possible right at the source.

Variations and Alternative Embodiments

It is possible to have straight or curved swing arms. Arms that are curved away from the centerline allow for more clearance for the banjo.

Each of the components of the system can be made from various materials. The ideal material for the track would be an aluminum extrusion, but other materials will also work. The articulating or swing arms could be of aluminum, molded plastics, sheet plastics, phenolic resins, plywood, or machined metal parts.

The track or guide means can be added as an accessory to the lathe, or it can be initially fabricated right into the back side of the lathe body. Alternatively, a space can be created on the cast-iron body of the lathe where a track can be placed. This would create a lower profile and no protruding aluminum extrusion for dust to settle on. Ideally, the top of the track or guide means would be flat and not have an integrated track on the top surface so there would be no place for dust and chips to collect. Alternatively, it could be angled away from the lathe so that dust slides off rather than accumulate on the surface.

An alternative to the Track 20 or guide means would be a set of rails designed to allow for sliding the sliding bracket assembly to slide on these guide rails. One option would be to have two round holes within the sliding bracket assembly allowing for two round rails of slightly smaller diameter, to allow the sliding bracket assembly to slide along the rails and slide parallel to the rails. The holes can be any profile and the rails can have any matching profile, but round would be the easiest for fabrication and cost.

Some lathes are structured in such a way as to not have a surface to attach or incorporate the track 20. These lathes often have structural members which are at 90 degrees to the axis of the lathe. Simple adapters such as "L" or "U" shaped brackets, will typically allow connection of the sliding "T" bolts to these structural members.

Additionally, some lathes such as the large lathes manufactured by Oneway Mfg might have other fixtures or hardware attached to the back of the lathe so track 20 needs to be spaced away from the lathe. In this case, a simple "U" shaped bracket will space the track a set distance away and secured to the lathe.

It may not be desirable to drill a hole through the body of the lathe. If it is undesirable to drill a hole through the body of the lathe, it is possible to attach the track by other means such as a clamp or a magnetic system. In one embodiment, the T nut would thread into the clamp body and the clamp would clamp to the body of the lathe.

The dust collection port 36 and corresponding hose, would ideally be made for a 4 inch diameter hose or larger. Larger hoses provide better dust collection, but 4 inch diameter hose is currently the most commonly used. A smaller machine may utilize an even smaller hose and a larger machine could use a larger hose.

Two or more separate sliding assembly systems can be used in tandem on the same track. One can be used for a light source, and a second system used for dust collection. Or, both a dust port and a light fixture can be connected to the same single telescoping or swing arm system.

I claim:

1. An apparatus in combination with a lathe for positioning a dust collection device at said lathe wherein said lathe comprises a bed, and said apparatus includes:
   a. a linear guide comprising a track attached to said lathe and having a first groove and a second groove, said first groove having a generally T-shaped cross section including a first portion having a first width and a second portion having a second width greater than said first width, a longitudinal axis of said track is substantially parallel to a first surface of said bed of said lathe;
   b. a sliding bracket assembly comprising a first plate having a first surface and a second surface opposite said first surface, a protrusion extending from said second surface and configured to be received in said first portion of said groove, whereby said sliding bracket is configured to slide along said linear guide, said sliding bracket having a second plate having a first end attached to a first end of said first plate and terminating in a free distal end, said second plate having an aperture extending therethrough;
   c. an adjustable arm having a first end attached to said second plate via said aperture with a bolt extending therethrough, said adjustable arm having a handle attached to said second bolt, said handle being configured to lock and permit pivoting said adjustable arm relative to said second plate via interaction with said second bolt;
   e. a dust collection port attached to a second end of said adjustable arm opposite said first end of said adjustable arm;
   whereby said adjustable arm may be positioned at various angles relative to said second plate and said sliding bracket assembly may be positioned in various locations along said linear guide to position said dust collection port into various positions relative to said bed of said lathe.

2. The apparatus as in claim 1 wherein said adjustable arm is a telescopic tubing system.

3. The apparatus as in claim 1 wherein said linear guide is an aluminum extruded track.

4. The apparatus as in claim 1 further comprising said second end of said adjustable arm wherein said dust collection port is attached to said second end of said adjustable arm by, wherein twisting of said second end of said adjustable arm, allows for the attached dust collector port to be twisted in multiple angles.

5. The apparatus as in claim 1 where said second end of said adjustable arm is attached to a swivel head and a means to tighten or loosen said swivel head to said second end of said adjustable arm allows rotation of said swivel head relative to said second end of said adjustable arm, wherein said dust collection port is attached to said swivel head.

* * * * *